United States Patent [19]

Costain et al.

[11] Patent Number: 5,527,224

[45] Date of Patent: Jun. 18, 1996

[54] QUICK COUPLING CUE STICK

[75] Inventors: Paul Costain, 21 Wellesley Rd., Beverly, Mass. 01915; Gary Fumarola, Beverly, Mass.

[73] Assignee: Paul Costain, Beverly, Mass.

[21] Appl. No.: 325,622

[22] Filed: Oct. 18, 1994

Related U.S. Application Data

[63] Continuation of Ser. No. 79,488, Jun. 18, 1993, abandoned.

[51] Int. Cl.⁶ .................................................. A63D 15/08
[52] U.S. Cl. ............................................................... 473/44
[58] Field of Search ................................................. 473/44

[56] References Cited

U.S. PATENT DOCUMENTS

| | | |
|---|---|---|
| 248,681 | 10/1881 | Walter . |
| 682,677 | 9/1901 | Ferchland . |
| 970,172 | 9/1910 | Bloom et al. . |
| 4,231,574 | 11/1980 | Williams ........................ 473/44 |

FOREIGN PATENT DOCUMENTS

| | | |
|---|---|---|
| 2191707 | 12/1987 | United Kingdom . |
| 2219946 | 12/1989 | United Kingdom . |
| 2226251 | 6/1990 | United Kingdom ............... 473/44 |
| 2246302 | 1/1992 | United Kingdom . |

OTHER PUBLICATIONS

Drawing of coupling rod maunufactured by Bender Cues for securing to one stick portion of a cue stick (Jul. 13, 1992).

*Primary Examiner*—Mark S. Graham
*Attorney, Agent, or Firm*—Hamilton, Brook, Smith & Reynolds

[57] ABSTRACT

A multiple piece cue stick includes multiple stick portions which are coupled together by a sleeve bushing secured to one stick portion and a coupling rod secured to another stick portion. The coupling rod has a elongate shaft which fits within a smooth bore of the sleeve bushing and is coupled to the sleeve bushing by engaging male threads of the coupling rod with female threads of the sleeve bushing.

14 Claims, 3 Drawing Sheets

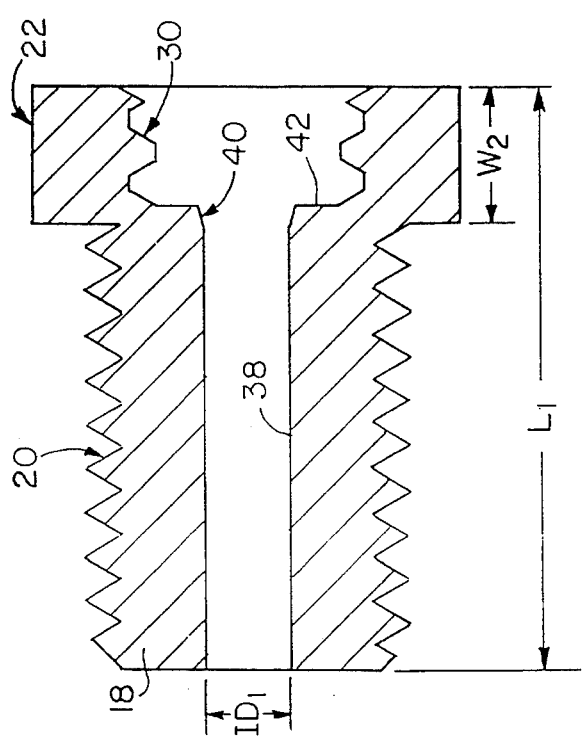
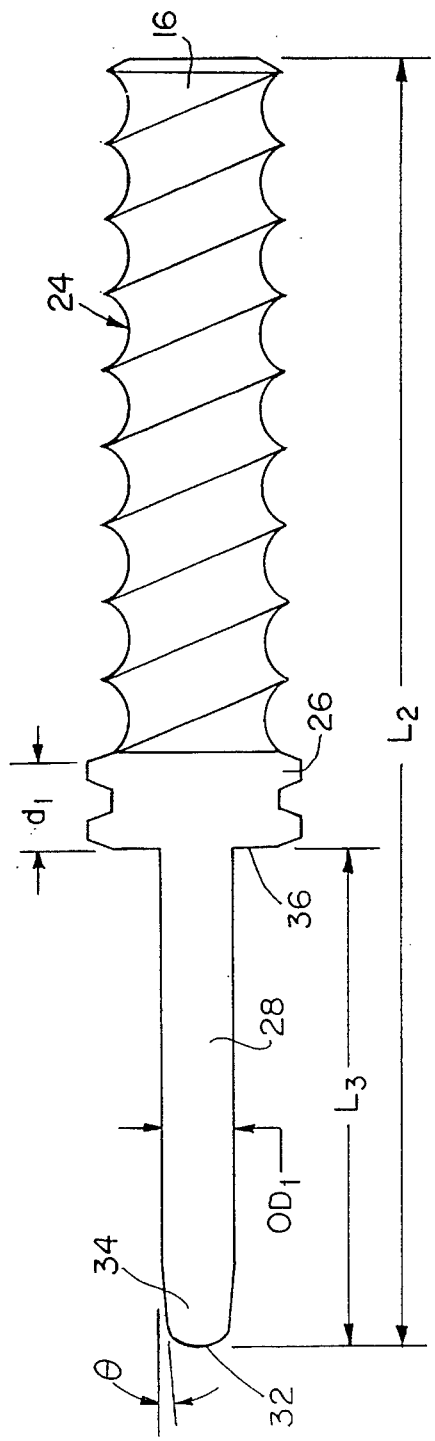

QUICK COUPLING CUE STICK

This application is a continuation of application Ser. No. 08/079,488, filed on Jun. 18, 1993, now abandoned, which is incorporated herein by reference in its entirety.

BACKGROUND

Multi-piece cue sticks for playing pool are generally two piece sticks which consist of a lower shaft portion and an upper butt portion which can be assembled together for use or disassembled for transportation. Traditionally, the shaft and the butt are joined together with a two-piece coupling. The coupling usually includes a bushing having a standard female thread secured within the lower shaft portion of the cue stick and a rod having a mating male thread secured within the upper butt portion of the cue stick. The two portions of the cue stick are joined together by screwing the male thread of the rod into the mating female thread of the bushing until the end of the shaft portion of the cue stick contacts the end of the butt portion of the cue stick.

SUMMARY OF THE INVENTION

A problem with this type of coupling is that the two portions of the cue stick may not become concentric with each other when joined together. A non-concentric cue stick is undesirable because a non-concentric cue stick does not transfer energy to a pool ball as efficiently as a concentric stick and therefore, the pool ball is not hit as sharply. Additionally, assembling the cue stick together by screwing the threaded rod into the bushing is time consuming, therefore, making it unsuitable to disassemble the cue stick during a game for using only the shaft portion as a cue stick when there are space constraints or for jumping the cue ball.

Accordingly, there is a need for a multi-piece cue stick in which the various portions of the cue stick can be assembled together so that the pieces are concentric with each other. Furthermore, there is a need for the coupling of the multiple piece cue stick to be quickly engaged and disengaged so that the user can assemble and disassemble the cue stick quickly during a game.

The present invention provides a cue stick which includes a first stick portion coupled to a sleeve. The sleeve has a smooth inner diameter portion and a female coupling region. A second stick portion is coupled to a coupling rod. The coupling rod has a smooth, elongate tip which has a close fit with the smooth inner diameter of the sleeve and a male coupling region which engages the female coupling region of the sleeve for coupling the coupling rod to the sleeve.

In preferred embodiments, the female coupling region of the sleeve is an internal threaded region and the male coupling region of the coupling rod is a first external threaded region. The sleeve has an external threaded region for coupling the sleeve to the first stick portion. The coupling rod has a second external threaded region for coupling the coupling rod to the second stick portion.

In one preferred embodiment, the internal threaded region of the sleeve and the first external threaded region of the coupling rod are acme-type threads which are capable of being coupled together by twisting the sleeve and the coupling rod relative to each other.

The present invention provides a multi-piece cue stick which can be rapidly assembled and disassembled by twisting the various pieces relative to each other in one revolution or less. Additionally, the two pieces are joined together concentric with each other which enables the pieces to transfer energy more efficiently, thereby, allowing the user to hit a pool ball more sharply. Furthermore, the quick assembly and disassembly feature of the present invention cue stick allows cue sticks of two or more pieces to be assembled and disassembled during a game.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 2 is a sectional view of the sleeve bushing.

FIG. 3 is a side view of the coupling rod.

DETAILED DESCRIPTION OF THE PREFERRED EMBODIMENTS

Figure 1:
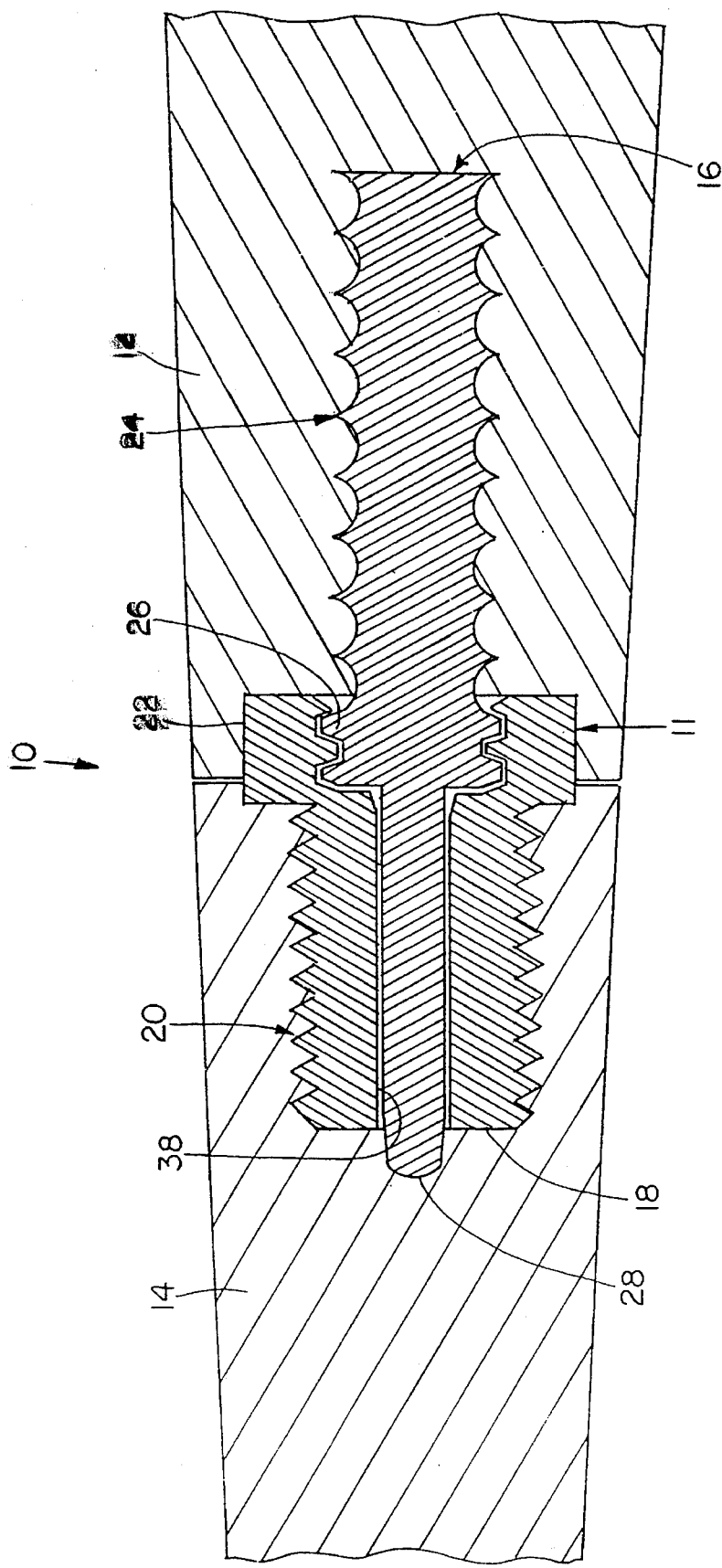
FIG. 1 is a sectional view of the present invention cue stick at the region where two portions of the cue stick are coupled together.

Referring to FIGS. 1, 2 and 3, multi-piece cue stick 10 has a lower stick portion 14 and a upper stick portion 12 joined together by coupling 11. Coupling 11 includes a sleeve bushing 18 and a coupling rod 16 which are coupled to stick portions 14 and 12 respectively.

Sleeve bushing 18 has a threaded region 20 and a smooth bore 38. Sleeve bushing 18 is coupled to stick portion 14 by screwing and glueing the sleeve bushing 18 into stick portion 14. Alternatively, sleeve bushing 18 and lower portion 14 can be coupled together by other suitable means. Coupling rod 16 has a smooth shaft region 28, a threaded region 26 and a threaded region 24. Coupling rod 16 is secured to stick portion 12 by screwing and glueing threaded region 24 into stick portion 12.

Stick portions 14 and 12 are coupled together by inserting shaft 28 of coupling rod 16 into bore 38 of sleeve bushing 18 and twisting coupling rod 16 so that threaded regions 26 and 30 engage each other. Shaft 28 and bore 38 are in a close slip fit with each other and locate stick portions 14 and 12 concentric with each other within 0.0005 inches when threaded regions 26 and 30 are engaged. This allows energy to be transferred from upper stick portion 12 to lower stick portion 14 efficiently so that a pool ball can be hit sharply with cue stick 10. Threaded regions 26 and 30 have a large lead angle and allow stick portions 14 and 12 to be coupled to each other between approximately ¼ to one revolution relative to each other. This permits the user of cue stick 10 to quickly assemble and disassemble cue stick 10 during a game. Furthermore, this makes it feasible to use cue sticks having more than two pieces in a game.

In a preferred embodiment, the external threaded region 20 of sleeve bushing 18 is a M12×1.75 3E4E type thread (FIG. 2). This provides sleeve bushing 18 with a large enough wall thickness to allow threaded region 30 to be a 0.360–11×0.160 inches deep stub acme thread. Inner diameter $ID_1$ of bore 38 is dimensioned to be in a slip fit with shaft 28 with a diameter of 0.2751 inches+0.0002/–0.0000. A chamfer 40 between threaded region 30 and bore 38 provides a smooth transition between threaded region 30 and bore 38. Chamfer 40 is 15°×0.060 inch chamfer. The length $L_1$ of sleeve bushing 18 is one inch. Additionally, the width $W_2$ of bushing head 22 is 0.130 inches wide while the diameter of bushing head 22 is 0.500 inches.

In a preferred embodiment, shaft 28 has an outer diameter $OD_1$ of 0.275 inches+0.000/–0.0002 (FIG. 3). The tip 34 of shaft 28 is angled at 5° for 0.250 inches and terminates at a radius 32. This allows shaft 28 to easily engage bore 38 of sleeve bushing 18 without damaging the parts. When coupling rod 16 engages sleeve bushing 18, shoulder 36 is tightened against shoulder 42. Shaft 28 has a length $L_3$ of one inch. Thread region 26 is a 0.360-11 stub acme-4G type thread which has a length $d_1$ of 0.180 inches. The stub acme thread allows up to ¼ to one full turn of engagement to tighten lower portion 14 to upper portion 12. Threaded region 24 has a diameter of 0.3125 inches+0.0005/–0.005 with a 0.156 full radius between the threads and a lead to a sharp point. The total length $L_2$ of coupling rod 16 is preferably four inches long.

The slip fit between shaft 28 and bore 38 is shown to be –0.0001 loose to 0.0005 loose which achieves a maximum concentricity of 0.0005 between lower portion 14 and upper portion 12. However, the diameter $OD_1$ of shaft 28 and the inner diameter $ID_1$ of bore 38 can be dimensioned to be within only 0.001 inches of concentricity.

Figure 4:
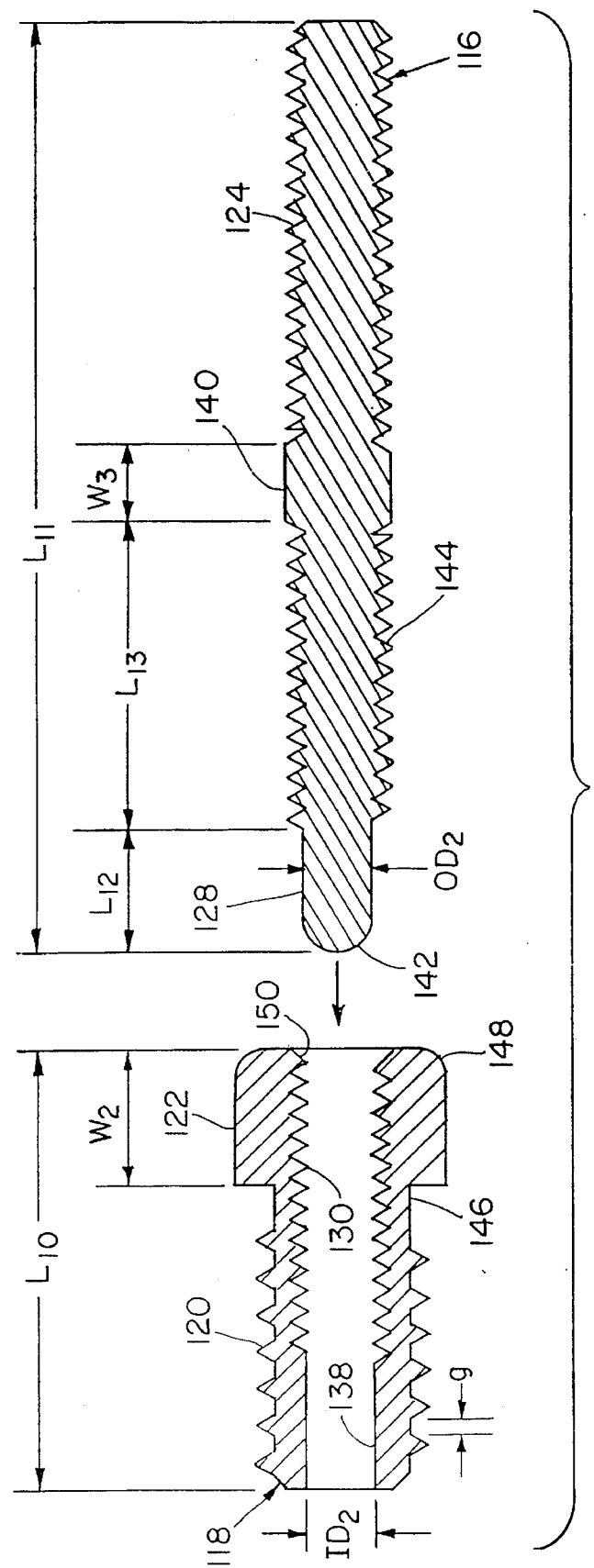
FIG. 4 is a sectional view of a sleeve bushing and a coupling rod of a preferred embodiment.

FIG. 4 depicts another preferred embodiment of the present invention in which a sleeve bushing 118 and a coupling rod 116 are used to couple stick portion 14 to stick portion 12. Sleeve bushing 118 is fastened to lower portion 14 by screwing threaded portion 120 into lower stick portion 14. Coupling rod 116 is secured to upper stick portion 12 by screwing and glueing threaded region 124 to upper stick portion 12.

In order to engage coupling rod 116 with sleeve bushing 118, shaft 128 is inserted into bore 138 and rotated to engage threaded region 144 with threaded region 130. The inner diameter $ID_2$ and outer diameter $OD_2$ are dimensioned relative to each other to provide a close slip fit so that lower portion 14 and upper portion 12 are concentric with each other.

In a preferred embodiment, bushing head 122 has a width $W_2$ of 0.110/0.115 inches and a radiused edge 148 of 0.020/0.025 inches. The inner diameter $ID_2$ of bore 138 is 0.1800/0.1803 inches. A 45° chamfer 150 allows threaded portion 144 to easily engage threaded region 130. Neck 146 is 0.373+/–0.002 inches in diameter by 0.110 inches wide. Threaded region 120 is a 7/16-14×0.780 long thread which has an outer diameter of 0.436/0.430 inches and a pitch diameter of 0.389/0.384 inches. The gap "g" between the threads is 0.018/0.021 inches wide. The total length $L_{10}$ of sleeve bushing 118 is one inch. The threaded region 130 has a 0.310–12.3×0.800 inches deep thread with a pitch diameter of 0.2557/0.2562 inches and an inner diameter of 0.241/0.237 inches. The outer diameter of bushing head 122 is 0.481+0.000/–0.001 inches.

In a preferred embodiment, the outer diameter $OD_2$ of shaft 122 is 0.1800/0.1798 inches. Radius 142 allows the easy engagement of shaft 128 with bore 138. The length L12 of shaft 128 is 0.240/0.250 inches. Threaded region 144 is a 0.310–12.3 thread×0.750+/–0.005 inches long with a pitch diameter of 0.2555/0.2558 inches. Smooth portion 140 is a transition region separating threaded regions 124 and 144. Transition region 140 has a width $W_3$ of 0.250 inches. Threaded region 124 is a 5/16-14 thread having a outer diameter of 0.310/0.306 inches and a pitch diameter of 0.264/0.261 inches.

Although specific dimensions have been shown for sleeve bushings 18 and 118 and coupling rods 16 and 116, those dimensions can be varied accordingly to accommodate different applications. Additionally, the materials for sleeve bushings 18, 118 and coupling rod 16 and 116 can be made from any suitable materials such as brass, aluminum, bronze, plastic, silver and gold as well as ferris materials such as iron or steel. Additionally, sleeve bushings 18 and 118 can be coated with Teflon™ while the coupling rods 16 and 116 are coated with a hard coat. This insures that the sleeve bushings 18 and 118 and the coupling rod 16 and 116 do not wear out quickly. Additionally, sleeve bushings 18 and 118 and coupling rod 16 and 116 can be machined between centers on a lathe. Furthermore, shaft sections 12 and 14 can have a flat machined on them so that a logo can be put on the flat. Additionally, a laser can be used to mark stick portions 12 and 14.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

We claim:

1. A cue stick comprising:
   a first stick portion coupled to a sleeve, the sleeve having a smooth inner diameter portion and an internal threaded region having a single uninterrupted constant diameter thread with a quick lead; and
   a second stick portion coupled to a coupling rod, the coupling rod having a smooth elongate tip which has a close fit with the smooth inner diameter of the sleeve and a first external threaded region having a single uninterrupted constant diameter thread with a quick lead, the first external threaded region engages the internal threaded region of the sleeve for coupling the coupling rod to the sleeve, the sleeve and the coupling rod being capable of being coupled securely together within approximately one revolution of the coupling rod.

2. The cue stick of claim 1 in which the sleeve has an external threaded region for coupling the sleeve to the first stick portion.

3. The cue stick of claim 1 in which the coupling rod has a second external threaded region for coupling the coupling rod to the second stick portion.

4. The cue stick of claim 1 in which the internal threaded region of the sleeve and the first external threaded region of the coupling rod have truncated threads.

5. The cue stick of claim 1 in which the tip of the coupling rod has a 5° angle for about 0.250 inches.

6. The cue stick of claim 1 in which the tip of the coupling rod terminates at a radius.

7. A cue stick comprising:
   a first stick portion coupled to a sleeve, the sleeve having a smooth inner diameter portion and an internal threaded region having a single uninterrupted constant diameter thread with a quick lead; and
   a second stick portion coupled to a coupling rod, the coupling rod having a smooth elongate tip which has a close fit with the inner diameter of the sleeve and a first external threaded region having a single uninterrupted constant diameter thread with a quick lead, the first external threaded region engages the internal threaded region of the sleeve for coupling the coupling rod to the sleeve, the sleeve and the coupling rod being capable of being coupled securely within approximately one revolution of the coupling rod, the internal threaded region of the sleeve and the first external threaded region of the coupling rod having truncated threads.

8. The cue stick of claim 7 in which the sleeve has an external threaded region for coupling the sleeve to the first stick portion.

9. The cue stick of claim 7 in which the coupling rod has a second external threaded region for coupling the coupling rod to the second stick portion.

10. The cue stick of claim 7 in which the tip of the coupling rod has a 5° angle for about 0.250 inches.

11. The cue stick of claim 7 in which the tip of the coupling rod terminates at a radius.

12. A cue stick comprising:

a first stick portion coupled to a sleeve, the sleeve having an internal threaded region having a single uninterrupted constant diameter thread; and a second stick portion coupled to a coupling rod, the coupling rod having a first external threaded region having a single uninterrupted constant diameter thread, the first external threaded region engages the internal threaded region of the sleeve for coupling the coupling rod to the sleeve, the sleeve and the coupling rod being capable of being coupled securely together within approximately one revolution of the coupling rod.

13. The cue stick of claim 12 in which the length of the external threaded region of the coupling rod is about 0.18 inches.

14. A coupler for a cue stick comprising:

a sleeve for coupling to a first stick portion, the sleeve having an internal threaded region having a single uninterrupted constant diameter thread; and a coupling rod for coupling to a second stick portion, the coupling rod having a first external threaded region having a single uninterrupted constant diameter thread, the first external threaded region engages the internal threaded region of the sleeve for coupling the coupling rod to the sleeve, the sleeve and the coupling rod being capable of being coupled securely together within approximately one revolution of the coupling rod.

* * * * *